US006879980B1

(12) United States Patent
Kothuri et al.

(10) Patent No.: US 6,879,980 B1
(45) Date of Patent: Apr. 12, 2005

(54) NEAREST NEIGHBOR QUERY PROCESSING IN A LINEAR QUADTREE SPATIAL INDEX

(75) Inventors: Ravi Kanth V. Kothuri, Nashua, NH (US); Siva Ravada, Nashua, NH (US); Jayant Sharma, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 556 days.

(21) Appl. No.: 09/893,550

(22) Filed: Jun. 29, 2001

(51) Int. Cl.[7] .............................................. G06F 17/30
(52) U.S. Cl. ............................ 707/5; 707/4; 707/104.1
(58) Field of Search .............................. 707/1–5, 100, 707/104.1

(56) References Cited

U.S. PATENT DOCUMENTS

| | | | |
|---|---|---|---|
| 5,615,321 A | | 3/1997 | Corn |
| 5,740,280 A | | 4/1998 | Leonardi et al. |
| 5,848,373 A | | 12/1998 | DeLorme et al. |
| 5,963,956 A | * | 10/1999 | Smartt ...................... 707/104.1 |
| 5,990,896 A | | 11/1999 | Barrus |
| 6,014,641 A | | 1/2000 | Loeb et al. |
| 6,021,406 A | * | 2/2000 | Kuznetsov ..................... 707/6 |
| 6,130,673 A | | 10/2000 | Pulli et al. |
| 6,134,541 A | * | 10/2000 | Castelli et al. ................. 707/2 |
| 6,148,295 A | * | 11/2000 | Megiddo et al. ................ 707/3 |
| 2001/0011270 A1 | * | 8/2001 | Himmelstein et al. ......... 707/3 |
| 2002/0027567 A1 | * | 3/2002 | Niamir ....................... 345/738 |
| 2002/0147703 A1 | * | 10/2002 | Yu et al. ........................ 707/2 |
| 2002/0151315 A1 | * | 10/2002 | Hendrey ..................... 455/466 |
| 2002/0165854 A1 | * | 11/2002 | Blayvas et al. ................ 707/3 |

OTHER PUBLICATIONS

Samet, Hanan. "The Quadtree and Related Hierarchical Data Structures." ACM Computing Surveys (CSUR), vol. 16, Issue 2, pp. 187–260. Jun. 1984. ACM Press.*

Hjaltason et al. "Distance Browsing in Spatial Databases." ACM Transactions on Database Systems (TODS). vol. 24, No. 2, pp. 265–318. Jun. 1999. ACM Press.*

* cited by examiner

Primary Examiner—Safet Metjahic
Assistant Examiner—Brian Goddard
(74) Attorney, Agent, or Firm—Swidler Berlin LLP

(57) ABSTRACT

A method for locating neighbor objects of a query object in a database. A query tile set is defined including a plurality of tiles that define an initial query radius that the query object is grouped within. Neighbor objects are located within the initial query radius. A number of neighbor objects within the initial query radius is determined. The query radius is expanded beyond the initial query radius by defining an expanded query tile set beyond the query tile set if the number of neighbor objects is less than a target number. Neighbor objects are located within the expanded query radius. It is determined whether a number of neighbor objects within the expanded query radius corresponds to a target number. The query radius is expanded and neighbor objects located within the expanded radius until the number of neighbor objects equals or exceeds the target number.

30 Claims, 11 Drawing Sheets

(a)          (b)          (c)

|   |   |   |   |   |   |   |   |   |
|---|---|---|---|---|---|---|---|---|
|   |   |   |   |   |   |   |   |   |
|   | 3 | 3 | 3 | 3 | 3 | 3 | 3 |   |
|   | 3 | 2 | 2 | 2 | 2 | 2 | 3 |   |
|   | 3 | 2 | 1 | 1 | 1 | 2 | 3 |   |
|   | 3 | 2 | 1 | 0 | 1 | 2 | 3 |   |
|   | 3 | 2 | 1 | 1 | 1 | 2 | 3 |   |
|   | 3 | 2 | 2 | 2 | 2 | 2 | 3 |   |
|   | 3 | 3 | 3 | 3 | 3 | 3 | 3 |   |
|   |   |   |   |   |   |   |   |   |

Fig. 8

NEAREST NEIGHBOR QUERY PROCESSING IN A LINEAR QUADTREE SPATIAL INDEX

FIELD OF THE INVENTION

The present invention relates to a method for determining relationships among objects in a database.

BACKGROUND OF THE INVENTION

One system for organizing data in particular types of databases is the quadtree index. A quadtree index is a two-dimensional equivalent to a conventional b-tree index used to locate data within a linear array, and is typically used to locate points in a two-dimensional space.

In the linear quadtree indexing scheme, the coordinate space (for the layer where all geometric objects are located) is subjected to a process called tessellation, which defines exclusive and exhaustive cover tiles for every stored geometry. Tessellation may be carried out by decomposing the coordinate space in a regular hierarchical manner. The range of coordinates, the coordinate space, may be viewed as a rectangle.

At the first level of decomposition, the rectangle may be divided into halves along each coordinate dimension generating four tiles. Each tile that interacts with the geometry being tessellated may be further decomposed into four tiles. This process continues until some termination criteria, such as size of the tiles or the maximum number of tiles to cover the geometry, is met.

Either fixed-size or variable-sized tiles may be utilized to cover a geometry. Fixed-size tiles may be controlled by tile resolution. If the resolution is the sole controlling factor, then tessellation can terminates when the coordinate space has been decomposed a specific number of times. Therefore, each tile is of a fixed size and shape.

Variable-sized tiling may be controlled by the value supplied for the maximum number of tiles. If the number of tiles per geometry, n, is the sole controlling factor, the tessellation terminates when n tiles have been used to cover the given geometry.

Smaller fixed-size tiles or more variable-sized tiles may provide better geometry approximations. The smaller the number of tiles, or the larger the tiles, the coarser are the approximations.

The process of determining which tiles cover a given geometry is called tessellation. The tessellation process is a quadtree decomposition, where the two-dimensional coordinate space is broken down into four covering tiles of equal size. Successive tessellations divide those tiles that interact with the geometry down into smaller tiles, and this process continues until the desired level or number of tiles has been achieved. The results of the tessellation process on a geometry are stored in a table.

The tiles at a particular level can be linearly sorted by systematically visiting tiles in an order determined by a space-filling curve as shown in FIGS. 1a, 1b, and 1c. The tiles can also be assigned unique numeric identifiers, known as Morton codes or z-values. The terms tile and tile code will be used herein interchangeably in this and other sections related to spatial indexing.

The indexing may be carried out in a variety of ways. One indexing method is known as fixed indexing. Fixed spatial indexing uses tiles of equal size to cover a geometry. Because all the tiles are the same size, they all have codes of the same length, and the standard equality operator can be used to compare tiles during a join operation. This results in excellent performance characteristics. Two geometries are likely to interact, and hence pass the primary filter stage, if they share one or more tiles.

Alternatively, hybrid indexing may be utilized. Hybrid indexing can utilize tiles that do not all have the same dimensions. In fact, hybrid indexing can utilize tiles that have fixed dimensions and tiles that have variable dimensions. A set of fixed tiles and a set of variable dimension tiles may each fully cover a geometry.

As described above, fixed and hybrid indexing may be utilized in spatial quadtree indexing. The effectiveness and efficiency of a fixed indexing method can depend upon the tiling level and the variation in size of the geometries in the layer. While a small fixed-size tile is typically selected to cover small geometries, if a similar size tile is utilized to cover a very large geometry, a large number of tiles would be required. However, if the chosen tile size is large, so that fewer tiles are generated in the case of a large geometry, then the index selectivity suffers because the large tiles do not approximate the small geometries very well. FIGS. 2 and 3 illustrate relationships between tile size, selectivity, and the number of cover tiles.

FIG. 2 illustrates a small fixed-size tile. With a small fixed size tile, selectivity is good. However, a large number of tiles is needed to cover large geometries. In the example shown in FIG. 2, a window query would easily identify geometry A and geometry B, but would reject geometry C.

In contrast to the example shown in FIG. 2, FIG. 3 illustrates a large fixed-size tile. With a large fixed size tile, fewer tiles are needed to cover the geometries. However, the selectivity of large fixed size tiles is not as good as small tiles. The same window query shown in FIG. 2 would probably pick up all three geometries. Any object that shares tile T1 or T2 would identify object C as a candidate, even though the objects may be far apart, such as objects B and C are in FIG. 3.

All elements in a geometry are tessellated. In a multi-element geometry, if a second element were covered by a tile from the tessellation of a first element and retiling resulted in subdivision of a larger tile into smaller tiles, one of which was completely contained in the second element, then that tile would be excluded with respect to the second element because it would not interact with the geometry.

Quadtree hybrid indexing uses a combination of fixed-size and variable-sized tiles for spatially indexing a layer. Variable-sized tile spatial indexing uses tiles of different sizes to approximate a geometry. Each geometry will have an associated set of fixed-size tiles that fully cover the geometry, and also an associated set of variable-sized tiles that fully cover the geometry.

For most applications, quadtree hybrid indexes are not utilized. Rather, quadtree fixed indexes or R-tree indexes are employed instead. The circumstances where hybrid indexes typically are considered can include when joins are required between layers having significantly different optimal fixed index level values or tile resolution, such as on the order of four or more levels. It may be possible to obtain better performance by bringing a layer with a higher optimal level down to a lower level and adding a parameter to ensure adequate tiling of the layer.

The best starting value for the number of tiles in a new hybrid layer can be calculated by obtaining a count of the number of rows in the spatial index table and dividing this number by the number of rows with geometries in the layer, then rounding up. A spatial join is not a common requirement for applications, and it is comparable to a spatial cross product where each of the geometries in one layer will be compared with each of the geometries in the other layer.

When both of the following are true for a single layer, hybrid indexing may also be preferable. First, a layer has a mixture of many geometries covering a very small area and many polygons covering a very large area. Second, an optimal fixed tiling level for the very small geometries will result in an extremely large number of tiles to be generated for the very large geometries, causing the spatial index to grow to an unreasonable size. If both of these conditions are true, it may be better to use the a parameter to obtain coverage for the smaller geometries, while keeping the fixed tile size relatively large for the large geometries by using a smaller level value.

FIG. 4 illustrates variable-sized cover tiles closely approximate each geometry. This results in good selectivity. The number of variable tiles needed to cover a geometry may be controlled using an appropriate parameter. A variable tile is subdivided if it interacts with the geometry, and subdivision will not result in tiles that are smaller than a predetermined size. This size, or tiling resolution, is determined by a default maximum tile value.

The following includes a description of the creation of a hybrid index. This section describes hybrid indexing, which uses both fixed-size and variable-sized tiles as a spatial indexing mechanism. For each geometry, a set of fixed-size tiles that fully covers the geometry is created. Additionally, a set of variable-sized tiles that fully covers the geometry is also generated. The terms "hybrid indexing", "hybrid tiling", and "hybrid tessellation" are used interchangeably in this section.

To use hybrid tiling, the level of tiling and the number of tiles typically are greater than 1. The value for the number of tiles determines the number of variable tiles that will be used to fully cover a geometry being indexed. Typically this value is small. For points, the number of tiles is always one. For other element types, the number of tiles could arbitrarily be set to a value. For example, a value of about eight could be utilized. In general, the greater the number of tiles, the better the tiles will approximate the geometry being covered. A larger value for the number of tiles can improve the selectivity of the primary filter. However, a larger value also increases the number of index entries per geometry. The number of tiles typically should be larger for long, linear spatial entities, such as major highways or rivers, than for area-related spatial entities, such as county or state boundaries.

The tiling level value can be utilized to determine the size of the fixed tiles used to fully cover the geometry being indexed. Setting a desirable value for tiling level may appears to include a great deal of guess work and may require performing data analysis and testing to determine a suitable value. One approach would be to utilize one value to determine an appropriate starting value, and then compare the performance with slightly higher or lower values.

Hybrid indexes can require tuning to optimize the index. Along these lines, hybrid indexing allows indexes to be built using the tiling mechanism by specifying the level of tiling. Additionally, hybrid indexing introduces the ability to specify the minimum number of tiles to be created for each geometry during the indexing process. If the number of tiles created for a geometry using one tiling level value is less than the value specified by the number of tiles value, then the indexing process continues by creating more tiles for the geometry until the number of tiles value has been reached.

The ability to specify the minimum number of tiles for each geometry is important for a number of reasons. It ensures that all geometries will have at least as many index entries as the number of tiles value, regardless of the tiling level. Also, it can reduce the space required for index data to get full indexing coverage of all geometries, as compared to fixed indexing. Furthermore, if hybrid indexing is used and if the layer being indexed is point-only data, the number of tiles value should be set to 1.

An element list typically includes the location of an element, such as the x and y coordinates of the element, if the element is a point and the tree is a Cartesian quadtree, a pointer to the corresponding element in a separate data structure such as the underlying "model" defining a geometric image in a computer assisted drawing program, and a pointer to the next associated element (if any). A quadtree index may be maintained using straightforward housekeeping routines for creating, deleting, and maintaining the quadtree index and its associated data structures.

In a spatial database, the quadtree can represent a map of a geographic region. The location of each element can represent the location of a feature in the region. For example, the elements could be dwelling units, businesses, parks, subway stations, museums, or any other desired object.

The determination of the positional relationship between two objects is an important aspect of spatial data processing. The process for determining whether objects interact is done in two stages.

The first phase compares the tiles that were generated as a result of the tesselation completed when the spatial index was built. This is known as the primary filter, and it uses the tile code comparisons to determine whether the geometries are likely to interact. Since the tile coverage of each geometry is complete, if any of the tile codes of one geometry match the tile codes of another geometry, then the geometries are passed to the next stage of processing known as the secondary filter. If none of the tile codes match, then there is no spatial interaction between the geometries, and no further processing is required to determine if the geometries interact.

The secondary filter stage does the full geometric comparisons between the two geometries to determine the relationship between them. This is a costly task, utilizing a lot of CPU and time to make the geometric calculations.

SUMMARY OF THE INVENTION

Regardless of the organization of the data in a database, it is often desired to determine relationships among the data. The nature of the process for determining relationships among data in a database can depend upon the nature and organization of the information stored in the database and the relationships that are being determined. In the case of a spatial database, it may be desired to determine relative positions of elements with respect to each other or with respect to a point(s) in the geographic area. In many cases, regardless of the database or its organization, the determination of relationships can overwhelm computing and memory capabilities.

The present invention provides a solution for searching databases that will not overwhelm the computing or memory capacities. As such, the present invention provides a method for locating neighbor objects of a query object in a database. A query tile set is defined that includes a plurality of tiles that define an initial query radius that the query object is grouped within. Neighbor objects are located within the initial query radius. A number of neighbor objects within the initial query radius is determined. The query radius is expanded beyond the initial query radius by defining an expanded query tile set beyond the query tile set if the number of neighbor objects is less than a target number. Neighbor objects within the expanded query radius are located. It is determined whether the number of neighbor objects within the expanded radius corresponds to a target number. The query radius is expanded and neighbor objects located within the expanded radius until the number of neighbor objects equals or exceeds the target number.

The present invention also includes a computer program product for performing a process for locating neighbor objects of a query object in a database in a computer system. The computer program product includes a computer readable medium and computer program instructions recorded on the computer readable medium and executable by a processor. The computer program instructions performing the steps of defining a query tile set comprising a plurality of tiles that define an initial query radius that the query object is grouped within, locating neighbor objects within the initial query radius, determining a number of neighbor objects within the initial query radius, expanding the query radius beyond the initial query radius by defining an expanded query tile set beyond the query tile set if the number of neighbor objects is less than a target number, locating neighbor objects within the expanded query radius, determining a number of neighbor objects within the expanded radius corresponding to a target number, and continuing to expand the query radius and locate neighbor objects within the expanded radius until the number of neighbor objects equals or exceeds the target number.

Additionally, the present invention provides a system for performing a process for locating neighbor objects of a query object in a database. The system includes a processor operable to execute computer program instructions and a memory operable to store computer program instructions executable by the processor. The computer program instruction performing the steps of defining a query tile set comprising a plurality of tiles that define an initial query radius that the query object is grouped within, locating neighbor objects within the initial query radius, determining a number of neighbor objects within the initial query radius, expanding the query radius beyond the initial query radius by defining an expanded query tile set beyond the query tile set if the number of neighbor objects is less than a target number, locating neighbor objects within the expanded query radius, determining a number of neighbor objects within the expanded radius corresponds to a target number, and continuing to expand the query radius and locate neighbor objects within the expanded radius until the number of neighbor objects equals or exceeds the target number.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings and description are to be regarded as illustrative in nature and not as restrictive.

BRIEF DESCRIPTION OF THE DRAWINGS

Objects and advantages of the present invention will be more clearly understood when considered in conjunction with the accompanying drawings, in which:

FIG. 8 represents diagram that shows progressive expansion of the query tile set in a plurality of incremental expansions;

DESCRIPTION OF THE PREFERRED EMBODIMENT(S)

Figure 1:
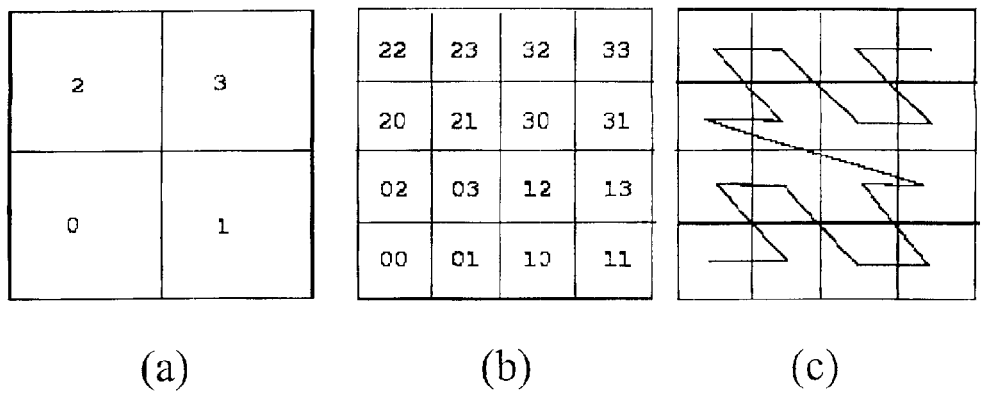
FIGS. 1a, 1b, and 1c represent an example of linear sorting of tiles at a particular level by systematically visiting tiles in an order determined by a space-filling curve.
Figure 2:
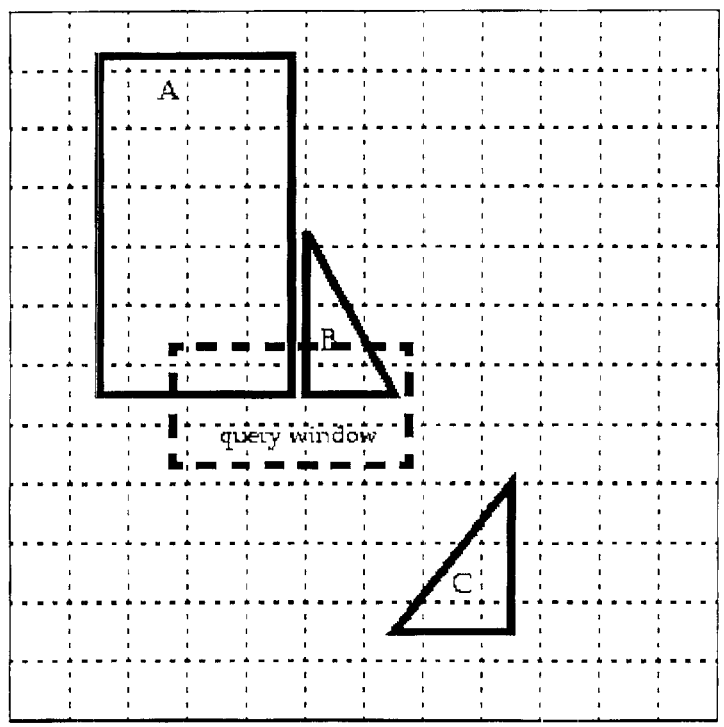
FIG. 2 represents an example of fixed indexing including fixed-size relatively smaller tiles to cover the geometries shown.
Figure 3:
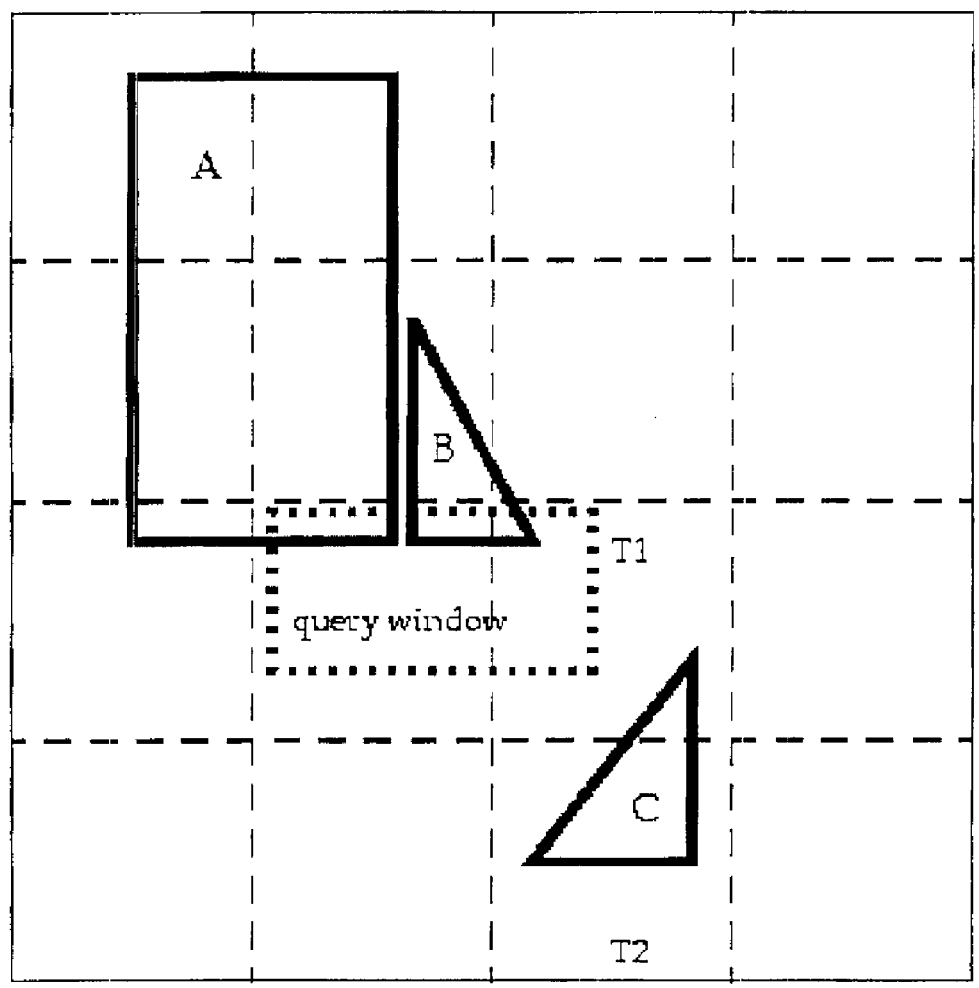
FIG. 3 represents an example of fixed indexing including fixed-size relatively larger tiles to cover the geometries shown.
Figure 4:
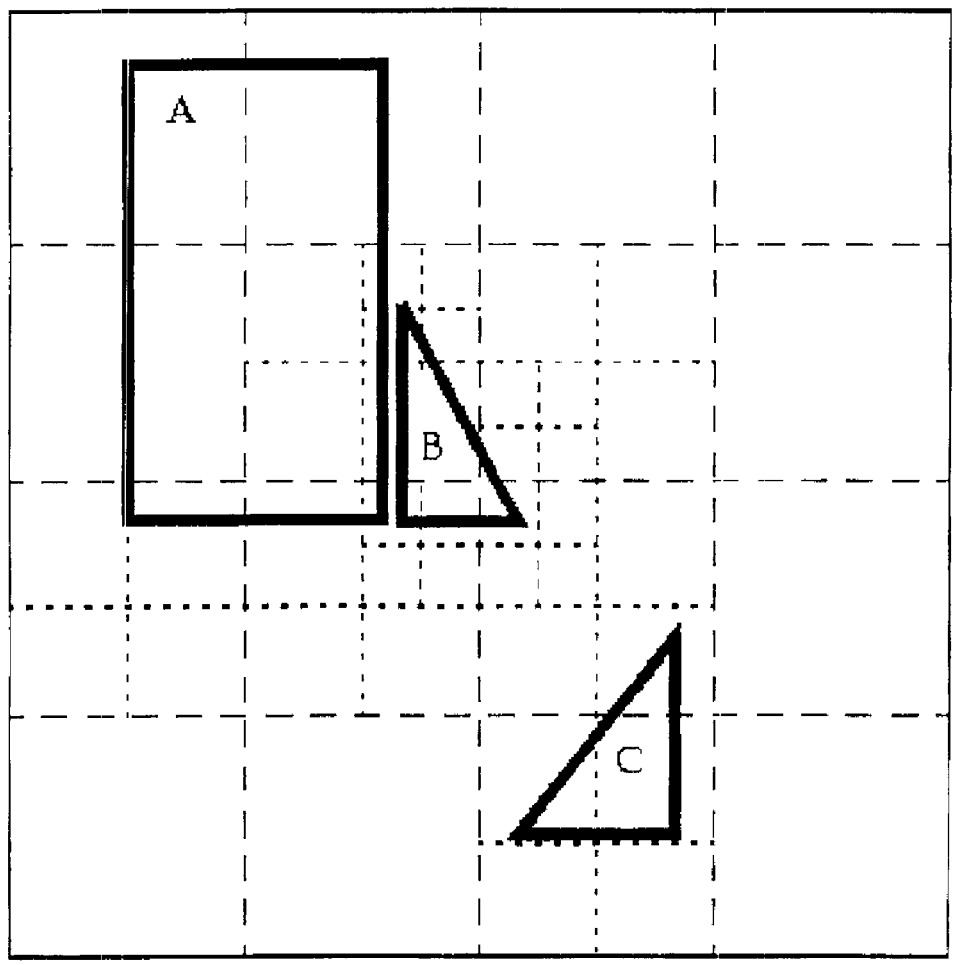
FIG. 4 represents an example of hybrid indexing including variable-sized cover tiles utilized to closely approximate each geometry shown.

A spatial or geographic database includes data concerning locations of features in a space or on a map. For example, a geographical database can include data concerning various locations in a region. Along these lines, the databases may include data concerning the nature and position of various locations in a region. For example, database could include the latitude and longitude as well as nature of homes, apartment buildings, businesses, parks, subway stations, and other locations in a geographical region.

Once a database including this information is created it is typically desired to access and utilize the information. One way that the information in the databases is utilized involves determining the position of particular types of locations. Along these lines, a person might want to find a dry cleaner at a certain location. Often, it is desired to find a certain type of business or other location in relation to another, user-specified location. For example, a person might desire to find the ten nearest restaurants of a specified location. Such uses of the data in spatial and geographic databases can present a number of problems.

To determine relationships between and among data in a database can overtax memory and computing power or take an unacceptable period of time. This is especially true with spatial and geographic databases. One approach to locate neighbor objects of a query object, typically a user-defined location, is to compute all distances from the query object to all spatial features in the database. In locating a predetermined number of objects, the nearest objects will then be selected. Such an approach requires scanning the entire database.

The present invention provides a solution to problems of analyzing databases indexed utilizing spatial indices. As such, the present invention provides a fast and simple method for determining a nearest neighbor. Advantages of the present invention can include providing a method that is adaptable to limited memory resources. This helps to ensure that the solution can be utilized with any spatial database, regardless of how large.

A quadtree is one index that may be utilized to organize data in spatial and geographic database systems. A general discussion of the quadtree appears above. The present invention utilizes the information in the quadtree organization concerning the data to incrementally search the data for selected neighboring objects.

To search for neighbors, a query object is first specified. The query object may also be described as a query location or query geometry. Typically, the query geometry represents a location within the geographic region covered by the database. The size of the region represented by the query geometry may vary. Along these lines, the query geometry could include a person's home. Alternatively, the query geometry could include an entire city. There is no upper limit on the size of the query geometry. The only limit on the lower limit of the size of the query geometry is the resolution of the database. In one case, the database has a resolution of about 1 meter.

After defining the query geometry, the geographic space represented by the query geometry is divided into a plurality of tiles. The size and number of the tiles may vary. Among the factors that can affect the size and number of the tiles are the memory of the processor utilized as well as the size of the query geography.

In the example where the query geometry represents a city, defined by the city limits, the tiles may have a size on the order of about 1 city block. For bigger cities, the tiles may have a size on the order of about ½ mile or 1 mile squares. When the query geometry represents a person's house, or a hotel, the tiles may start out with smaller sizes.

In one embodiment, the query geometry represents a city. The query geometry is centered on a particular location, such as a person's home. The present invention could then determine nearest neighbors to the person's home. This could be an alternative to having the person's home define the query geometry.

Figure 5:
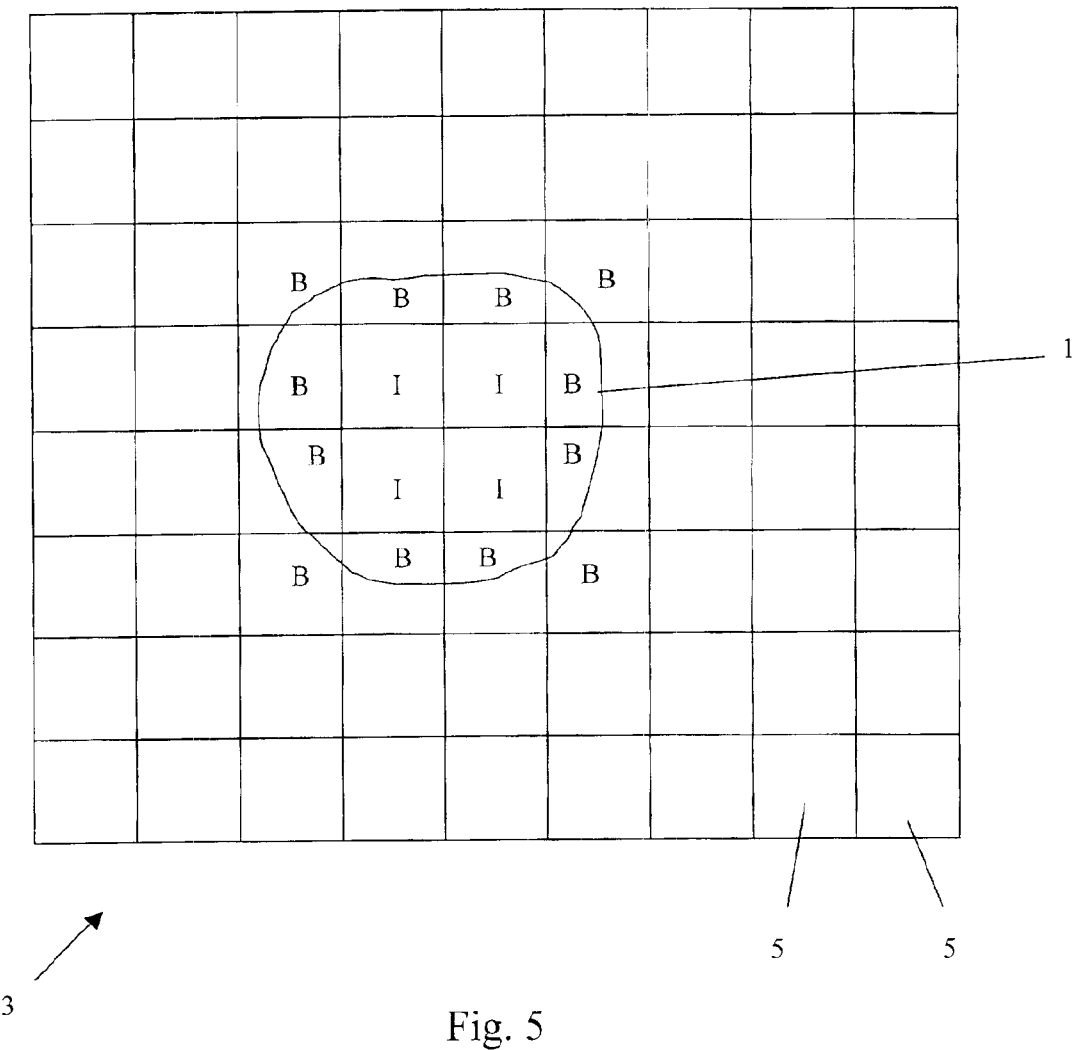
FIG. 5 represents a diagram that shows a defined initial query tile set that encompasses a query object, or geometry.

The number of tiles in the initial tile set may also vary. According to one embodiment, the number of tiles is 500. However, the number of tiles may vary from one up to a maximum number that the computer memory is capable of handling. One skilled in the art could determine the maximum number of tiles without undue experimentation once aware of the disclosure contained herein. FIG. 5 illustrates a query object 1 and an array 3 of tiles 5 that have been generated about the query object.

The tiles may have any desired shape. According to one embodiment, the tiles are rectangular. All of the tiles may have the same shape and size. Alternatively, the tiles may have a plurality of sizes and shapes. As the tiles are generated, each tile may be assigned a tile code and an associated geometry.

Once the initial tile set is defined, it is determined which tiles define geometry that lies entirely within the query geometry and which tiles the query geometry only partially lies within. The former are referred to herein as interior tiles and the latter as boundary tiles. The border tiles and boundary tiles make up the initial query tile set. The boundary tiles define what may be referred to as the "query search boundary" of query radius 0. FIG. 5 illustrates the identification of boundary tiles "B" and interior tiles "I".

Figure 6:
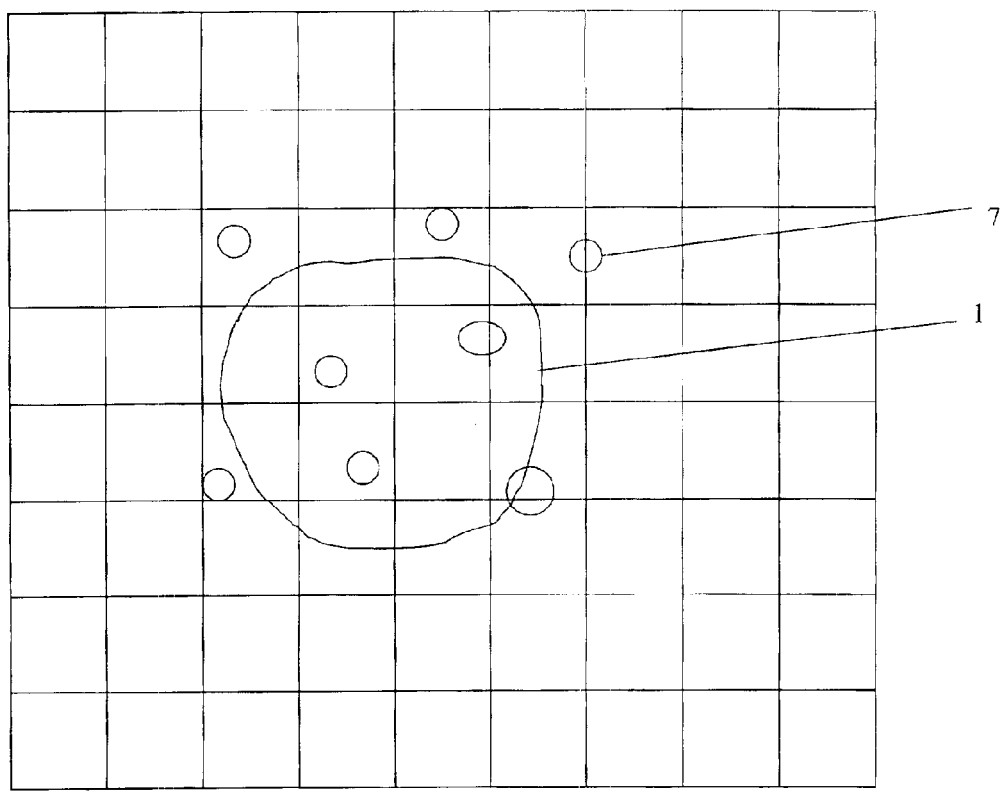
FIG. 6 represents a diagram that shows the location of a plurality of query objects, or geometries, in the initial query tile set shown in FIG. 5.

After defining the initial query tile set, it is determined whether any of the specified neighbor objects lie within the initial tile set. This may be accomplished by determining whether the neighbor object geometry intersects the initial query tile set. FIG. 6 illustrates a number of neighbor objects 7 in and around the query geometry 1. Some of the neighbor objects are interior to the query geometry and others lie within the initial query radius defined by the interior and boundary tiles. Also, the neighbor objects may lie entirely within a tile, or over a plurality of tiles.

Typically, a minimum, or target, number of neighbor objects to be located is specified prior to beginning a search for neighbor objects. The target number could be as low as 1; the target number does not have an upper limit. In some cases, the target number could be as many target objects as are found in the initial query tile set.

As it is determined whether any neighbor objects intersect the query geometry, a count of intersecting neighbor objects is maintained. Also, as the location of neighbor objects is determined, the location and geometry of the neighbor is stored. The distance between each neighbor object and the query object or geometry may also be calculated at this time and stored. Alternatively, the distance may not be calculated until the target number of neighbor objects is located.

The distance between the neighbor objects and the query geometry may be calculated as the distance from the border of the query geometry to the border of the neighbor objects. Alternatively, the distance could be the distance from the center of the neighbor objects to the center of the query geometry. This could be particularly useful where neighbor objects lie within the query geometry. Along these lines, the distance may be based upon interboundary distance, boundary-to-boundary distance, or touch or intersect distance. In reality, any desired distance measure may be utilized.

After the initial query tile set is scanned, the number of intersecting neighbor objects is determined and compared to the target number. If the number of neighbor objects is less than the target number, then the query tile set is redefined, by increasing the query radius of the "query search boundary". The query tile set is redefined.

According to one embodiment, the following steps are carried out:

1. the query geometry is tiled at level t, where t is the tiling level for the data;
2. after conducting a search with interior+boundary tiles, if the "target number of neighbors" is not reached, then the following steps are carried out starting with a radius r of 1:
3. query_search_boundary at radius r=files at distance d from boundary tiles, where $(r-1)*tw < d \leq r*tw$, wherein tw is the maximum or minimum of the x-width, y-width of a tile at level t and r is the query radius;
4. using each tile in query_search_boundary, it is determined if there are any geometries at distance $\leq r*tw$ that are to be included in the result set. Geometries at distances$>r*tw$ are included in the search with query radius r+1. To limit memory consumption, the whole set of tiles in query_search_boundary need not be materialized before proceeding to step 4. Instead the tiles can be run in small chunks. After a few thousand are found in step 3, step 4 could be applied on them. Step 3 could then be carried out again to identify additional tiles. Step 4 may then be applied on the additional tiles. This process can continue until all the tiles at a specific query radius have been generated, searched and included in a result. Duplicates are removed from the result. If more than the "target number" are in the result set, then only the nearest "target number" data items are retained. The searching process terminates at this point.

5. If the "target number" still is not reached, steps 3–4 are repeated with a query radius of 2-tile widths followed by 3-tile widths.

6. If the "target number" still is not reached, this means the nearest neighbors are far from the query. Repeating steps 3–4 by simply increasing the query radius will generate too many tiles and incur too much cost. This could be avoided by going to a higher level of tiling. So we go to step 1 and research by setting the tiling to t-1.

7. Repeat steps 1–7 until either the "target number" is reached or "all objects" in the database are searched.

It should be noted that in step 4, by setting the query radius to "r", all objects that are at distance "r" from the query are found and included in the query result if needed.

Figure 7:
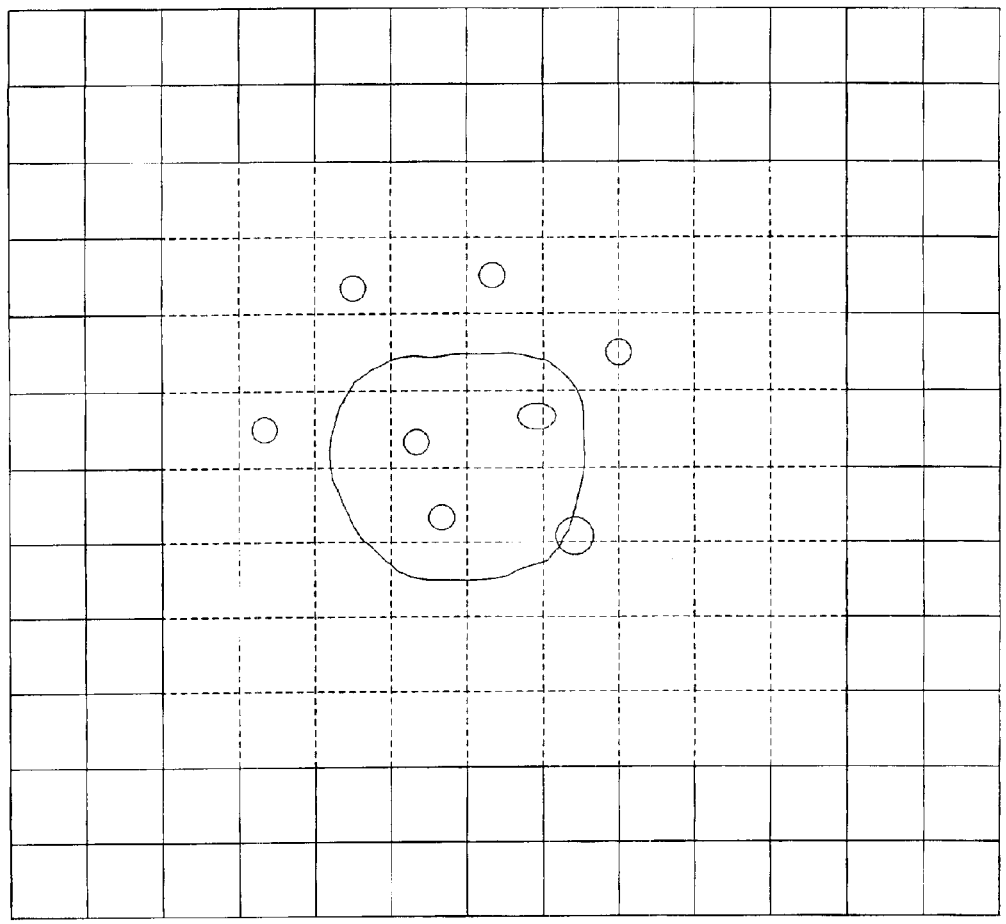
FIG. 7 represents a diagram that shows expansion of the initial query tile set to an expanded query tile set that borders the initial query tile set.

FIG. 7 illustrates an embodiment of an expanded tile set. In FIG. 7, the query tile set illustrated in FIGS. 5 and 6 is shown in broken lines. The expanded query tile set is shown in continuous lines outside of the initial query tile set. FIG. 7 illustrates the increase of the query radius over three iterations.

After carrying out the process described above in the numbered steps, if the target number is not reached the process may be restarted. If the process is restarted, the tiles typically are generated with larger dimensions to decrease the number of tiles generated to search a given area. Alternatively, the same number of larger tiles may be used to search a greater area. In either case, the steps described above may be carried out again.

Figure 9:
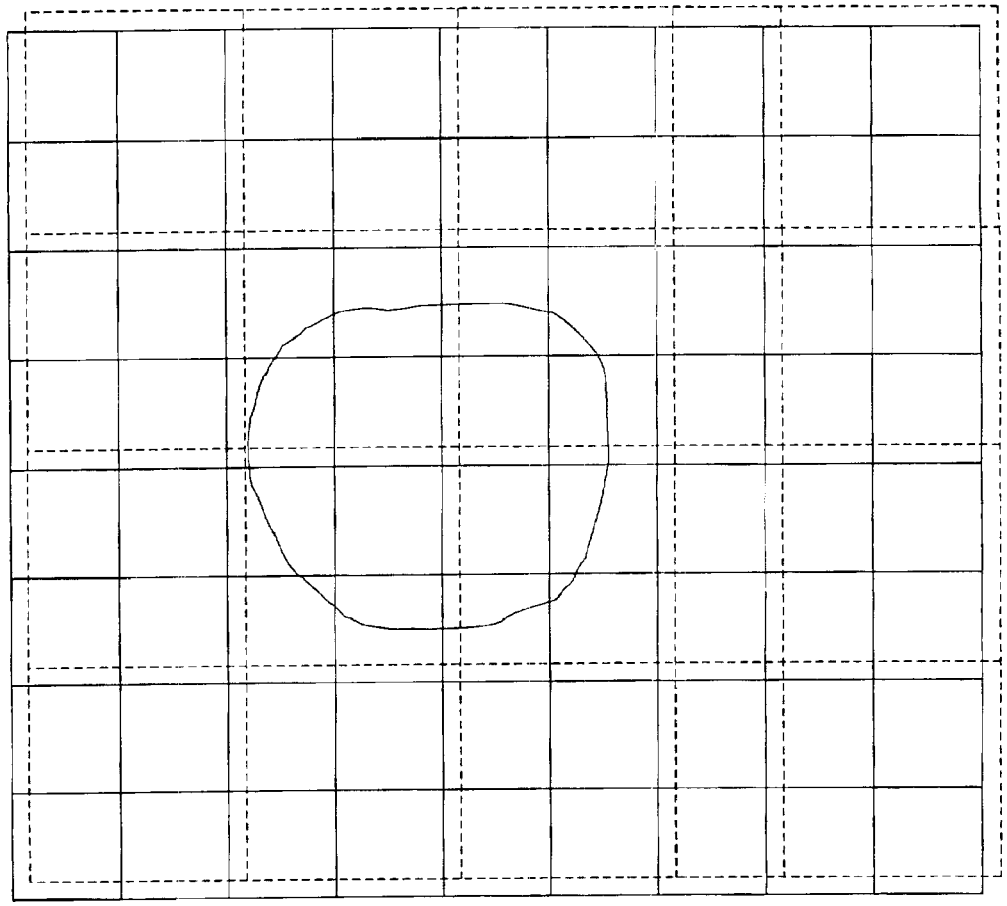
FIG. 9 represents a diagram that shows redefinition of the query tile set utilizing larger tiles.

FIG. 9 illustrates an example of tiles generated with larger dimensions. In FIG. 9, solid lines indicate the original tiles; broken lines indicate the expanded tiles. As can be see in FIG. 9, the expanded tiles have a size about four times larger than the original tiles.

Figure 10:
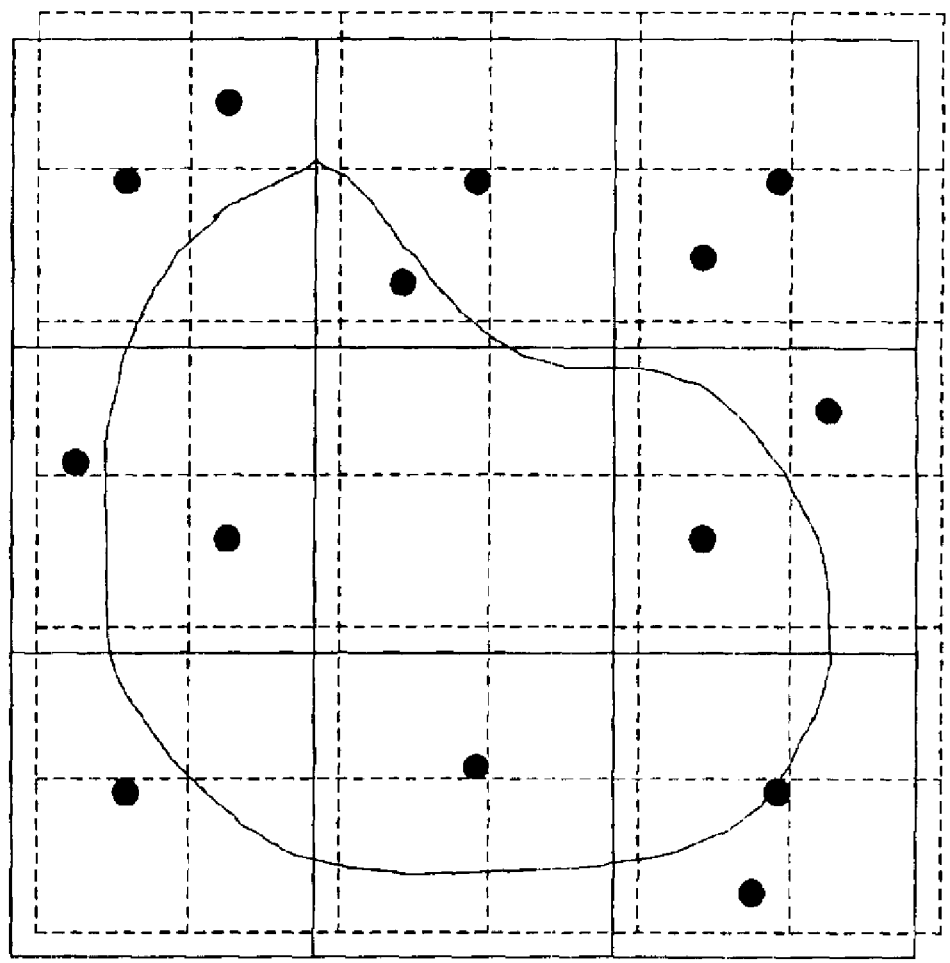
FIG. 10 represents a diagram that illustrates calculation of a distance between the query object and the neighbor objects.

The tiles may also be drawn smaller in some instances. This is illustrated in FIG. 10. In FIG. 10, the solid lines indicate larger tiles, while the broken lines indicate the smaller tiles. Utilizing small tile dimensions may necessitate carrying out an increased number of iterations of the process.

Once the tiles are regenerated with bigger dimensions, the process is carried out as described above. If the target number of neighbor objects is not found with a maximum number of iterations of the process, then the process may again be recycled back to the beginning to redefine the tiles again with even larger dimensions. The process may be carried out as many times as is necessary to derive the target number of neighbors. Alternatively, a maximum number of iterations and tile redefinitions may be set.

Figure 11:
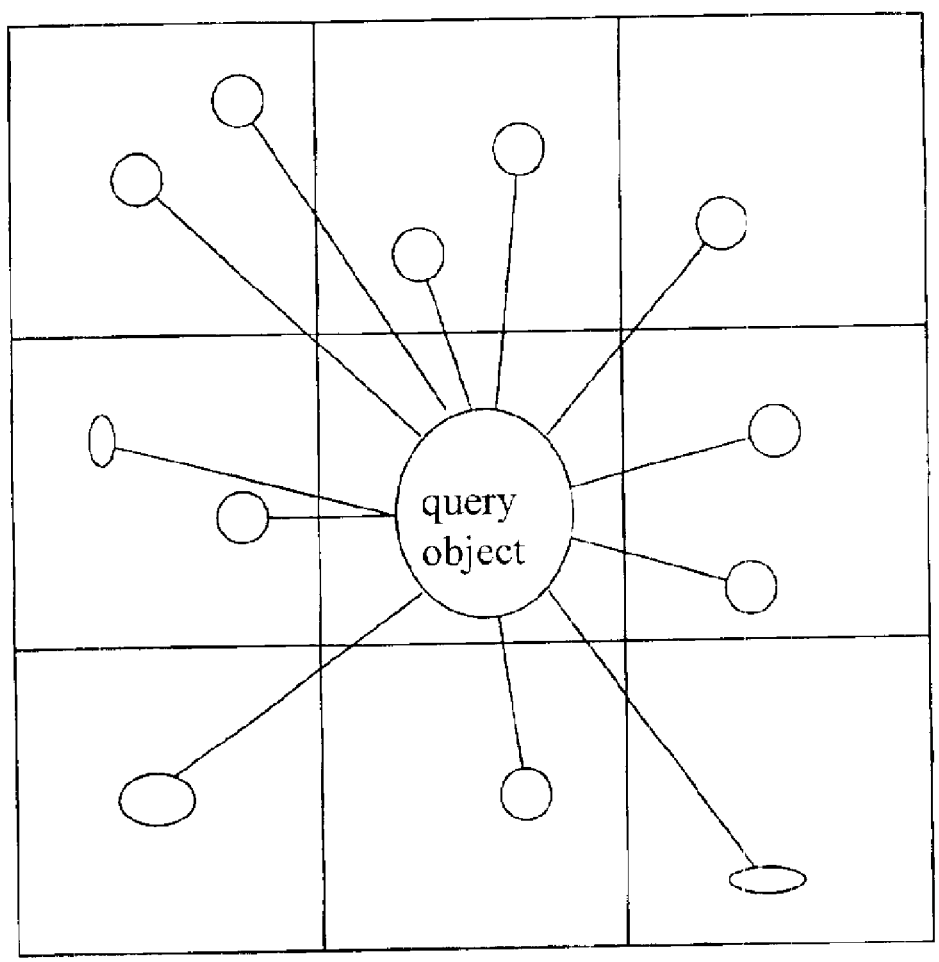
FIG. 11 represents a diagram that shows redefinition of the initial query tile set utilizing smaller tiles.

Unlike the situation where the target number of neighbor objects is not found in the initial query radius, it is possible that more than the target number of neighbor objects may be located. In such a case, the distance from each of the neighbor objects to the query geometry may be calculated to determine the target number of nearest neighbor objects. The neighbor objects may be organized based upon the distance from the target geometry. The distance calculation typically is carried out each time the number of neighbor objects meets or exceeds the target number, regardless of how many iterations are required. FIG. 11 illustrates an example of determining the distance from the neighbor objects to the query geometry. All of the neighbor objects shown in FIG. 11 lie outside the query geometry.

Each of the target number of neighbor objects may be displayed. Along with the neighbor objects, the location, distance to the query geometry and/or other information may be displayed.

Figure 12:
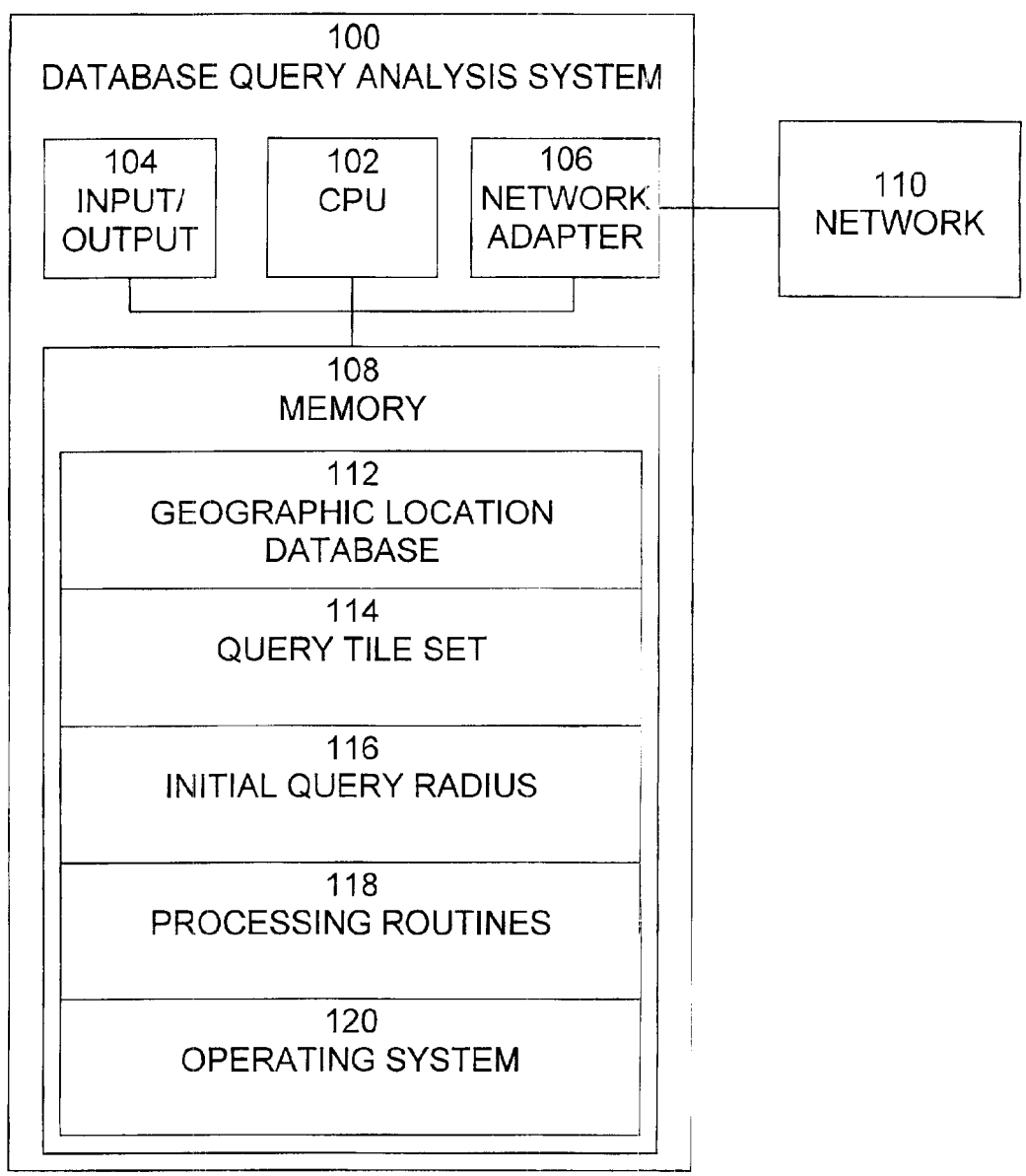
FIG. 12 represents an exemplary block diagram of a transaction processing system according to the present invention.

An exemplary block diagram of a database query analysis system 100, according to the present invention, is shown in FIG. 12. The database query analysis system 100 is typically a programmed general-purpose computer system, such as a personal computer, workstation, server system, and minicomputer or mainframe computer. The database query analysis system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM™ processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces database query analysis system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as geographic location database block 112, query tile set block 114, and initial query radius block 116, and a plurality of blocks of program instructions, such as processing routines 118 and operating system 120. Geographic location database block 112 stores a plurality of geographic locations previously defined. Query tile set block 114 stores the query tile set corresponding to the query. Initial query radius block 118 stores the set of tiles that is initially searched for neighbors according to the above-described process. Processing routines 118 are software routines that implement the processing performed by the present invention. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Processing spatial data and computing a spatial join is described in detail in U.S. Pat. No. 6,014,641, issued Jan. 11, 2000, to Herring et al. and assigned to the same assignee as the present application, the entire contents of the disclosure of which is hereby incorporated by reference. Also, Oracle 8i spatial, User's Guide describes aspects of processing data, the entire contents of the disclosure of which is hereby incorporated by reference.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiment.

We claim:

1. A method for locating neighbor objects of a query geometry in a database, the method comprising:
   1) tiling a query geometry at a tiling level t;
   2) conducting a search of a search area comprising interior and boundary tiles of the query geometry for neighbors among objects in the database, wherein the objects in the database are indexed using a linear quadtree index, if the search does not produce a result set that includes a target number of neighbors, then the following steps are carried out starting with a radius r of 1:
   3) expanding the search area to a radius r tiles at a distance d from the boundary tiles and conducting a search for neighbors in the expanded search area, where (r−1)*tw<d≦r*tw, wherein tw is the maximum or minimum of the x-width, y-width of a tile at level t and r is the query radius;
   4) using each tile in the expanded search area it is determined if there are any geometries at distance≦r*tw that are to be included in the result set;
   5) if a target number of neighbors is not found, steps 3–4 are repeated with a query radius of 2 tile widths followed by 3 tile widths;
   6) if the target number still is not reached retiling the query geometry at a higher level of tiling; and
   7) repeating steps 1–7 until either the target number is reached or all objects in the database are searched.

2. The method according to claim 1, wherein geometries at distances>r*tw are included in the search with query radius r.

3. The method according to claim 1, wherein only a portion of tile in the expanded query radius are materialized prior to searching the expanded query radius for neighbors, and wherein additional tiles are materialized until all tiles at a specific query radius have been generated, searched and included in a result.

4. The method according to claim 3, wherein about 1000 to about 5000 tiles are materialized prior to searching.

5. The method according to claim 3, further comprising removing duplicate neighbors from the result.

6. The method according to claim 3, further comprising:
   retaining only the target number of neighbors if more than the target number of neighbors is found and terminating the searching process.

7. A method for locating neighbor objects of a query object in a database, the method comprising:
   defining a query tile set comprising a plurality of tiles that define an initial query radius that the query object is grouped within, wherein the query object is a non-point object;
   locating neighbor objects among objects in the database within the initial query radius, wherein the objects in the database are indexed using a linear quadtree index, and wherein the objects in the database include a non-point object;
   determining a number of neighbor objects within the initial query radius;
   expanding the query radius beyond the initial query radius by defining an expanded query tile set beyond the query tile set if the number of neighbor objects is less than a target number;
   locating neighbor objects within the expanded query radius;
   determining if a number of neighbor objects within the expanded radius corresponds to a target number; and
   continuing to expand the query radius and locate neighbor objects within the expanded radius until the number of neighbor objects equals or exceeds the target number.

8. The method according to claim 7, further comprising:
   calculating a distance of each neighbor object from the query object.

9. The method according to claim 8, wherein the distance of each neighbor object from the center of the query object is calculated.

10. The method according to claim 8, wherein the distance is based upon interboundary distance, boundary-to-boundary distance, or touch or intersect distance.

11. The method according to claim 7, further comprising:
    redefining the initial query tile set as larger tiles to define a revised initial query radius if the target number of neighbor objects is not found in a minimum number of expansions of the query radius;
    locating neighbor objects within the revised initial query radius;
    determining a number of neighbor objects within the revised initial query radius;
    defining a revised expanded query radius beyond the revised initial query radius if the number of neighbor objects is less than the target number;
    locating neighbor objects within the revised expanded query radius;
    determining if a number of neighbor objects within the revised expanded radius corresponds to the target number; and
    continuing to expand the query radius and locate neighbor objects within the expanded radius until the number of neighbor objects equals or exceeds the target number.

12. The method according to claim 11, wherein the minimum number of expansions is three.

13. The method according to claim 11, further comprising:
   determining whether an increased number of tiles exceeds a memory capacity in which the database is stored prior to increasing the number of tiles; and
   if the increased number of tiles exceeds the memory capacity then redefining the tiles with an increased size.

14. The method according to claim 7, further comprising:
   calculating a distance of each located neighbor object from the query object if the number of neighbor objects in the initial query radius exceeds the target number to determine the target number of nearest neighbor objects.

15. The method according to claim 7, wherein the tiles are rectangular.

16. The method according to claim 7, wherein all of the tiles have the same shape and size.

17. The method according to claim 7, wherein the database comprises locations in a geographical region, the query object represents a first location in the geographical region, and the neighbor objects represent other locations in the geographical region.

18. The method according to claim 7, further comprising:
   assigning each tile a tile code and an associated geometry as the tiles are defined.

19. The method according to claim 7, wherein the query radius is expanded a selected distance and the method further comprises determining a number of tiles necessary to expand the query radius the selected distance.

20. The method according to claim 7, wherein the query radius is expanded a selected number of tiles.

21. The method according to claim 7, wherein the initial query radius and the expanded query radius comprise the same number of tiles.

22. The method according to claim 7, wherein the query object is grouped within a plurality of tiles.

23. The method according to claim 22, wherein the query object is grouped completely or partially within the tiles.

24. The method according to claim 7, wherein the database comprises a spatial or geographic database.

25. The method according to claim 7, further comprising:
   organizing the neighbor objects in order of distance.

26. The method according to claim 7, further comprising:
   calculating a distance of each located neighbor object from the query to determine the target number of nearest neighbor objects.

27. The method according to claim 7, wherein the query object comprises a geometry that at least partially intersects at least one tile and the neighbor objects comprise geometries that at least partially intersect at least one tile.

28. The method according to claim 27, wherein at least one tile that the neighbor objects intersect coincides with at least one tile that the query geometry intersects.

29. A computer program product for performing a process for locating neighbor objects of a query object in a database in a computer system, comprising:
   a computer readable medium; and
   computer program instructions, recorded on the computer readable medium, executable by a processor, for performing the steps of:
   defining a query tile set comprising a plurality of tiles that define an initial query radius that the query object is grouped within, wherein the query object is a non-point object;
   locating neighbor objects among objects in the database within the initial query radius, wherein the objects in the database are indexed using a linear quadtree index, and wherein the objects in the database include a non-point object;
   determining a number of neighbor objects within the initial query radius;
   expanding the query radius beyond the initial query radius by defining an expanded query tile set beyond the query tile set if the number of neighbor objects is less than a target number;
   locating neighbor objects within the expanded query radius;
   determining if a number of neighbor objects within the expanded radius corresponds to a target number; and
   continuing to expand the query radius and locate neighbor objects within the expanded radius until the number of neighbor objects equals or exceeds the target number.

30. A system for performing a process for locating neighbor objects of a query object in a database, comprising:
   a processor operable to execute computer program instructions; and
   a memory operable to store computer program instructions executable by the processor, for performing the steps of:
   defining a query tile set comprising a plurality of tiles that define an initial query radius that the query object is grouped within, wherein the query object is a non-point object;
   locating neighbor objects among objects in the database within the initial query radius, wherein the objects in the database are indexed using a linear quadtree index, and wherein the objects in the database include a non-point object;
   determining a number of neighbor objects within the initial query radius;
   expanding the query radius beyond the initial query radius by defining an expanded query tile set beyond the query tile set if the number of neighbor objects is less than a target number;
   locating neighbor objects within the expanded query radius;
   determining if a number of neighbor objects within the expanded radius corresponds to a target number; and
   continuing to expand the query radius and locate neighbor objects within the expanded radius until the number of neighbor objects equals or exceeds the target number.

* * * * *